Aug. 2, 1938.　　　E. J. SVENSON　　　2,125,322
COMPUTING DISPENSING DEVICE
Filed Aug. 4, 1937　　　4 Sheets-Sheet 3

Aug. 2, 1938.  E. J. SVENSON  2,125,322
COMPUTING DISPENSING DEVICE
Filed Aug. 4, 1937  4 Sheets-Sheet 4

Inventor:-
Ernest J. Svenson
By:- Cox & Moore attys.

Patented Aug. 2, 1938

2,125,322

UNITED STATES PATENT OFFICE 2,125,322

COMPUTING DISPENSING DEVICE

Ernest J. Svenson, Rockford, Ill., assignor to Petrolator Corporation, Chicago, Ill., a corporation of Illinois Application August 4, 1937, Serial No. 157,304

17 Claims. (Cl. 221—95)

My invention relates to liquid measuring and liquid distributing apparatus. My invention is particularly adapted to, and it is an object of my invention to provide, a new and improved fluid flow meter adjustable in accordance with predetermined price variations for correspondingly altering the capacity of the meter, and also my invention relates to and provides the utilization and adaptation of this improved flow meter in combination with other elements to form a computing type of liquid dispensing device, specifically, a computing type of gasoline dispensing pump.

One of the objects of my invention is to provide a meter and also to provide a fluid dispensing pump construction utilizing such a meter, wherein the meter is arranged to vary the flow in a fluid circuit by controlling the relative distance of travel of cylinder and piston elements and causing one of these elements to act upon a cam plate or other like member associated with the timing member, such, for instance, as valve means, for stopping and starting the relatively movable elements and providing a flow of fluid thereto during a predetermined angularity of the cam plate or like member.

A further object of the invention is to provide a meter, and also to provide a dispensing pump structure involving a meter, of the fluid displacement type, including one or more cylinders and pistons, provided with means adapted to control the fluid flow in such a manner that each piston will be arrested at a predetermined position in its return stroke, and by providing a cut-off or sealing means, preferably a valve, disposed so that upon a preselectable angular movement of a rotary plate operated by movement of the pistons the flow of fluid to said pistons will cease, whereby it is possible positively and accurately to determine the extent of travel of the aforesaid pistons, and, hence, accurately to determine the amount of liquid passed per unit of angular movement of said plate, and in connection with the dispensing of liquid the invention provides means for adjusting the cut-off or sealing means in increments of unit price per unit of volume and a total cost register operated by the meter a predetermined fixed amount per metering cycle for indicating the total cost of fluid passed through the meter during any given interval in definite terms of preselected increments of unit price per unit of volume.

A further object of my invention is to provide a new and more efficient type of fluid meter, and also to provide a new and more efficient type of liquid dispensing pump utilizing such a meter, wherein means are provided to feed a governed amount of fluid to a cylinder and a displaceable piston operating therein, as distinguished from a meter in which the stroke of the piston governs the amount of fluid measured by the successive movements of said piston.

A further object of the invention is to provide a meter, and also to provide a fluid dispensing apparatus utilizing such a meter, wherein the meter is provided with a plurality of cylinders and displaceable pistons operating therein, and wherein a cam plate or like member is rotated by the said pistons under the force of the fluid passing into and out of said cylinders, and wherein valve means is provided for governing the amount of fluid supplied successively to said cylinders and successively discharged therefrom, and wherein said valve means is in turn operated by said cam plate or like member together with means for adjustably shifting the valve means independent of said cam plate or like member for selectively governing the amount of fluid supplied to each of said cylinders for actuating the piston thereof and which governed amount of fluid in turn is discharged from said cylinders and measured.

A further object of the invention is to provide a new and more efficient type of liquid dispensing pump, including a liquid displacement-meter inserted in a flow line through which liquid under pressure is supplied for operating said meter, said meter including an operated shaft, a total cost register operated by said shaft to indicate the total cost of fluid measured by said meter during any predetermined operating interval in terms of a definite unit price per unit of volume, and including means for adjusting the unit cost per unit of volume, which adjusting means automatically causes the total cost register to indicate the total cost at any new setting of any new price per unit of volume, and wherein a simple type of adjustable gearing calibrated in accordance with variations in unit price per unit of volume is properly interconnected with said adjusting means whereby said last mentioned gearing will, in conjunction with a volume register, indicate the total volume of liquid dispensed by said meter.

Another object of the invention is to provide a liquid dispensing pump mechanism including a liquid flow line having inserted directly therein a meter of the type hereinbefore described which co-operates with a cost register for indicating the total cost of liquid measured by said meter during any given interval at any selected value of unit price per unit of volume, and in combination therewith a second meter disposed in said flow line in series with the first meter and operated by the liquid passed by said first meter, together with an amount or volume register operated by said second meter for indicating the total volume of liquid passing through said flow line during any given interval and corresponding in amount to the total cost indicated by said total cost register divided by the unit price per unit of volume, and wherein the meter operating the total cost register is adjustably controlled to vary the amount of liquid passed to the second meter in accordance with variations in unit price per unit of volume.

The foregoing and other objects of the invention will be more readily apparent from a perusal of the following specification taken in connection with the accompanying drawings, in which.

This application is a continuation-in-part of my prior copending application Serial No. 114,329, filed December 5, 1936, now issued as Patent No. 2,117,750, dated May 17, 1938.

My invention comprises three main subdivisions, to-wit, a new type of fluid displacement-meter, means providing for the adaptation and utilization of this type of meter with total cost and total volume registers, and means providing for the adaptation and utilization of this type of meter in a fluid dispensing pump in combination with a second meter of any desired type. This second meter is adapted to operate a total volume register and this second meter is wholly disconnected from mechanism operated by the first meter indicating the total cost of the liquid dispensed at selective units of price per unit of volume. The new type of fluid displacement-meter mentioned above is provided with means to feed a definite amount of fluid into the metering chambers thereof, which amount is proportional to and determined by the unit price per unit of volume of fluid being measured, said means being adjustably controllable to vary the amount of fluid so supplied in accordance with variations in the unit price per unit of volume, and said meter including means for operating a total cost register through a predetermined fixed extent per metering cycle, the movement of the total cost register being independent of the amount of fluid passed by the meter per metering cycle.

Another feature of my invention resides in providing in combination with this new type of meter, price control means for connecting the meter to a total volume or amount register whereby the extent of movement of the total volume register per metering cycle may be varied in accordance with price variations and in direct relation to variations in the governed amount of fluid supplied to the metering cylinders of said meter.

Figure 1:
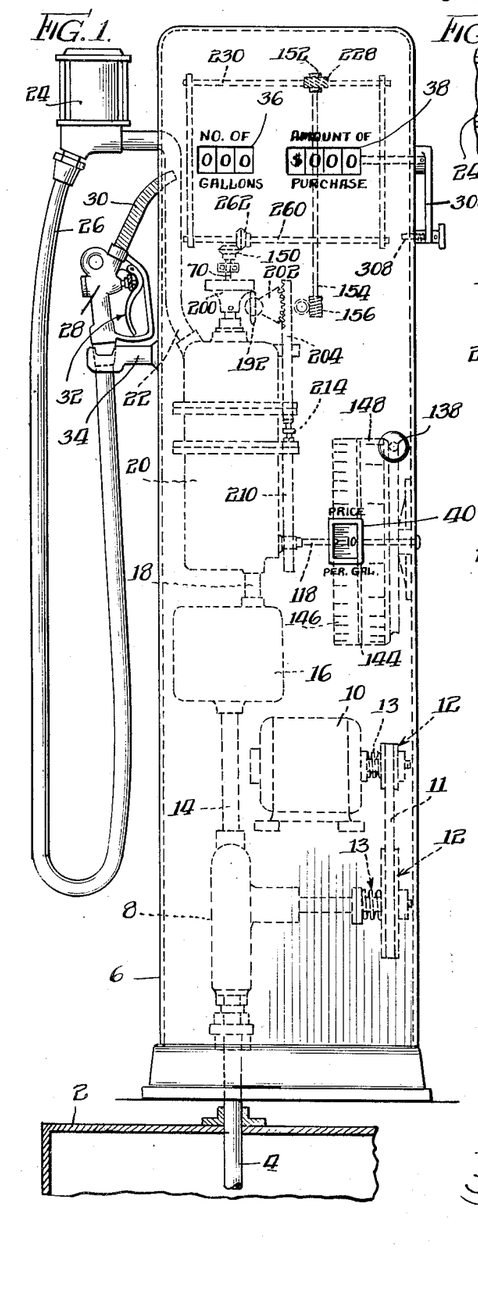
Fig. 1 is a side elevation of one form of my invention as adapted to a liquid dispensing device, more particularly a gasoline dispensing pump of the computing type.
Figures 4, 5:
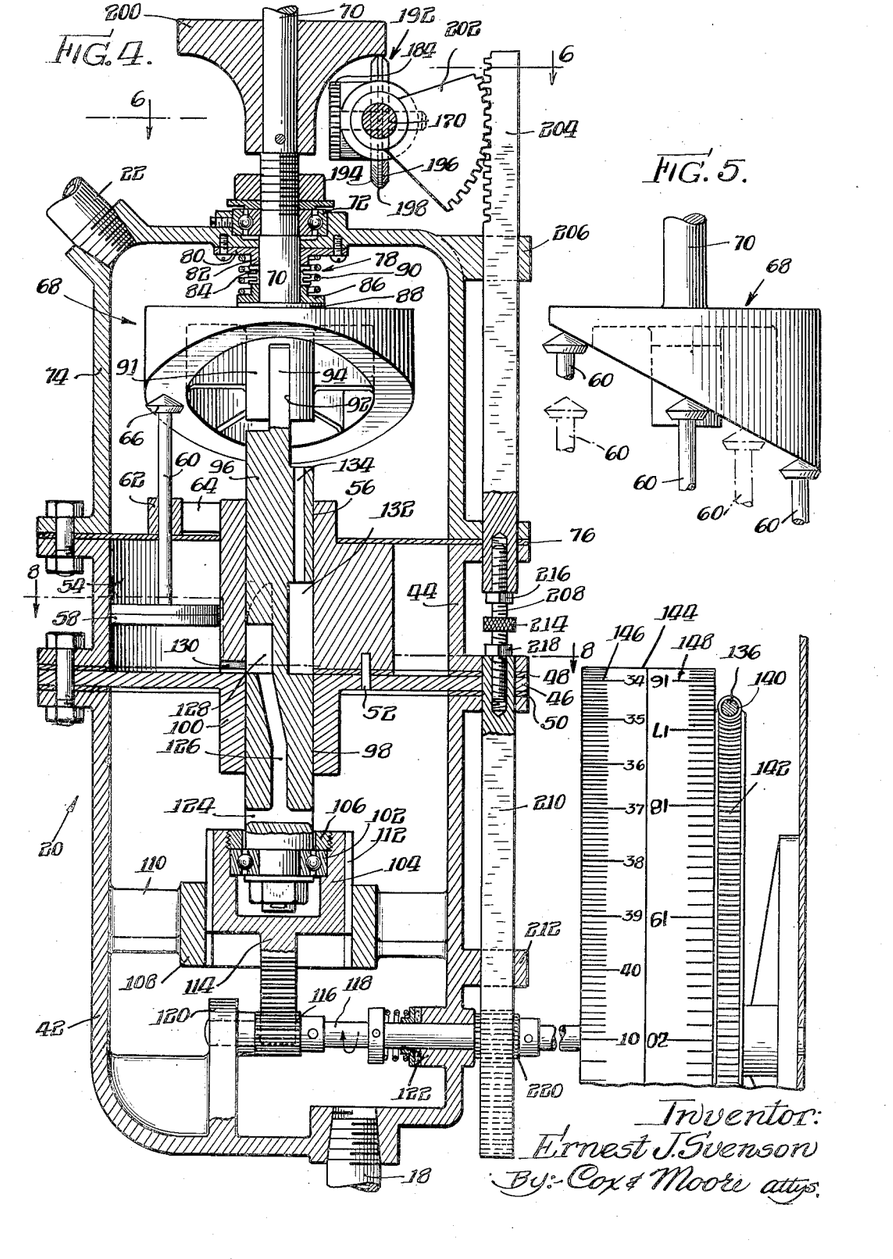
Fig. 4 is a section taken through a new and improved type of fluid displacement-meter comprising one of the aspects of my invention, which meter may be utilized independently of the combinations illustrated in Figs. 1 and 2 of the drawings.
Fig. 5 is a view of a cam plate and shows the various co-operating pistons.

I shall describe the construction and operation of the various features above set forth, and particularly the construction and operation of the specific form of meter shown in Fig. 4, by reference to the construction and operation of the gasoline dispensing pump shown in Fig. 1, it being understood, of course, that this description is not by way of limitation but purely for purposes of exposition.

Figure 3:
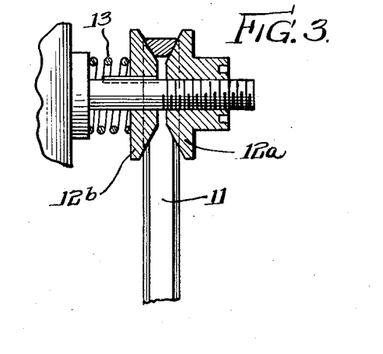
Fig. 3 is a detail sectional view of a part of the pump driving mechanism.

Referring now to the drawings in detail, there is provided the usual type of fluid reservoir, specifically, a gasoline reservoir 2, into which the usual pump inlet pipe 4 enters, being provided with the usual type of control valve which is well known in the art. This pipe enters into an upstanding casing 6 of any desired form, wherein there is disposed any type of pump 8 driven by a motor 10 by a suitable motion transmitting mechanism comprising a belt 11 and pulleys 12. Each pulley 12 comprises a disk 12a, Fig. 3, fixed to the motor shaft and a disk 12b splined on said shaft and movable axially thereof. The disks 12a and 12b are provided with beveled edge portions to receive therebetween the belt 11. A spring 13 interposed between the disk 12b and a stationary abutment controls the frictional driving engagement between the pulley and the belt. The gasoline discharged from the pump 8, passes through a pipe 14 into an air separator 16 and thence by a pipe 18 to a meter 20, specifically illustrated in Fig. 4. The discharge from this meter 20 passes through a pipe 22 to a sight glass 24 and thence through a flexible dispensing hose 26. The dispensing line is provided with a suitable flow control means such as a nozzle valve 28 at the end of the usual flexible hose. This nozzle valve is provided with a valve control lever 32 for controlling the flow therefrom and the usual stand-by hook 34 is provided to receive the nozzle when not in use.

The housing is provided with a plurality of windows, preferably on opposite sides thereof, there being on each side a window 36 in which an indication of the number of gallons dispensed may be displayed, a second window 38 in which a running indication of the total value of gasoline dispensed and the final value of the purchase may be displayed, and also a third window 40 for indicating the unit price, i. e., the price per unit of volume, specifically, cents or fractions of cents, per gallon, when used in the United States, and when used in other countries according to the units of price and volume.

The meter 20, as shown in Figs. 4 to 8, comprises a bowl 42 connected at its bottom to the pipe 18, and supporting at its upper end a cylinder block 44, a head block or plate 46 being interposed between the cylinder block and the bowl. Suitable gaskets 48 and 50 are interposed between the block 44, the bowl 42 and the plate 46. Suitable alining means such as pins 52 maintain the block 44 and plate 46 in proper relative position. The cylinder block 44 is provided with a plurality of angularly spaced cylinders 54, preferably five in number. The cylinders 54 are concentrically disposed relative to a central bore 56 formed in the block 44. Each cylinder is provided with a piston 58 having a piston rod 60 slidably mounted and guided in bosses 62 formed in a spider 64 or the like formed integrally with the block 44. Each piston rod 60 has at its upper end an enlarged conical head 66 engaging the cam surface of a rotary cam or like plate 68. The cam 68 is secured to or formed with a shaft 70 journaled by an antifriction bearing 72 in the top of a casting 74 forming an upper bowl for the meter 20, the bowl 74 being secured in any suitable manner to the top of the cylinder block 44. A suitable plate 76 is interposed between the bowl 74 and the block 44.

The bowl 74 is connected at its upper edge with the discharge pipe 22 and is secured against loss of fluid axially of the shaft 70 by a sealing means 78. The sealing means 78 comprises a collar or washer 80 secured to the top of the bowl 74 and having an axially extending annular flange 82 to which there is secured a diaphragm or sylphon 84. The sylphon or diaphragm 84 is connected at its lower end to a collar or washer 86 similar to the collar 80. A sealing washer 88, of any suitable material such as felt or the like, is interposed between the collar 86 and the upper surface of the cam 68. The collar 86 is loosely mounted on the shaft 70 and the spring 90 interposed between this collar and the collar 80 acts through the collar 86 to maintain the washer 88 in fluid-tight engagement with the upper surface of the cam.

The cam 68 has a downwardly depending central hub portion 91 slotted transversely as at 92. The transverse slot 92 extends axially of the hub 91 and slidably and adjustably receives the upwardly projecting end portion 94 of a rotary valve member 96. The slot 92 and the projecting end portion 94 are so shaped that the cam 68 and the valve member 96 rotate in unison. The rotary valve member 96 is slidably and rotatably journaled in the bore 56 of the cylinder block 44 and in a bore 98 formed in a boss 100 formed integrally with the cylinder head block or plate 46. At its lower end the valve member 96 is journaled by a suitable antifriction bearing 102 in a cup-shaped member 104, the bearing 102 being retained in the member 104 by a threaded ring 106. The cup-shaped member 104 is slidably and non-rotatably secured in the rim portion 108 of a spider 110 formed integrally with the bowl 42, this connection between the member 104 and the spider 110 being preferably accomplished by providing the member 104 with a plurality of axially extending peripheral projections 112 slidably received in similarly shaped slots cut from the inner surface of the rim portion 108. The cup-shaped member 104 is secured to or formed integrally with a downwardly depending rack bar 114 which meshes with a gear 116 secured to an adjusting shaft 118 suitably journaled in bearings 120 and 122 formed in the lower portion of the bowl 42. The shaft 118 extends outwardly of the bowl 42 for manual manipulation in a manner later to be described in order that the cup member 104 and the valve member 96 may be adjusted longitudinally relative to the spider 110 and the cylinders 54, respectively.

The valve member 96 is provided with a transverse inlet passage 124 in communication with the interior of the bowl 42 and in communication with a longitudinal passage 126 formed internally of the valve member. The valve passage 126 extends between the passage 124 and a quantity controlling valve recess 128 formed in the periphery of the valve member 96. The recess 128 is preferably of a shape as shown in Figs. 9, 11, 12 and 13, in which the base of the recess is substantially semicircular in outline and tapers longitudinally of the valve member 96 in a manner to provide an upper portion of minimum peripheral width, the circumferential width of the groove varying in direct proportion to its length axially of the valve. The valve inlet recess 128 communicates with the cylinders 54 by means of radial passages 130, Figs. 4 and 8, cut into the lower surface of the cylinder block 44. The recess or groove 128 determines the amount of fluid delivered to the cylinders 54.

Figures 8, 9, 10, 11, 12, 13:
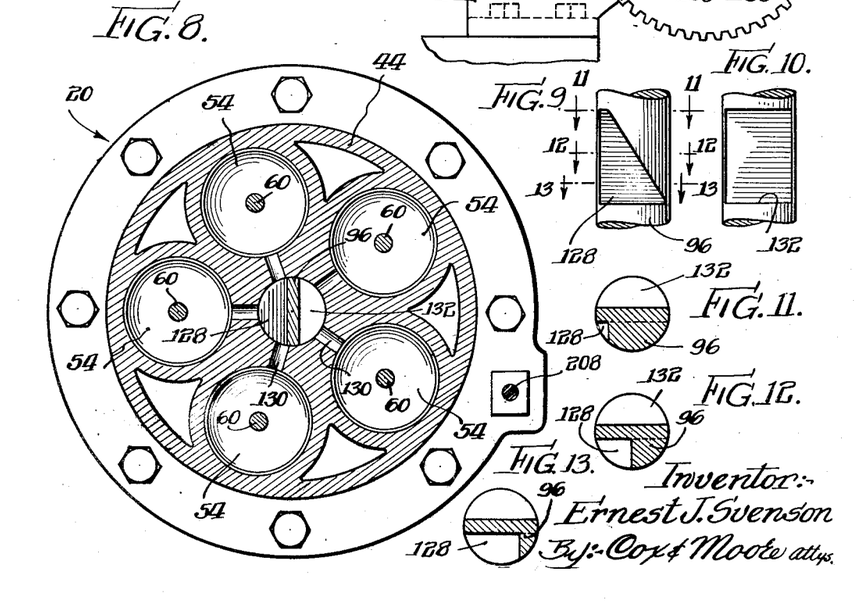
Fig. 8 is a horizontal section taken on the line 8—8 of Fig. 4.
Figs. 9 and 10 are detail views showing the control parts of the valve mechanism for the meter.
Figs. 11, 12 and 13 are horizontal sections taken along the lines 11—11, 12—12, and 13—13, respectively, of Fig. 9.

The valve 96 is additionally provided with an outlet port or groove 132 shaped as shown in Figs. 4, 8 and 10, and equal in axial length to the axial length of the intake port or groove 128. An internal port or groove 134 in the valve 96 places the port 132 into communication with the bowl 74 from which the fluid is exhausted through the pipe 22.

Means are provided for adjusting the shaft 118 and the valve 96 in accordance with variations in unit price per unit of volume of fluid metered. This means comprises a manually operable shaft 136 journaled in the pump casing 6, and provided at its extending end outwardly of said casing with an operating knob or crank 138. A worm 140 secured to the shaft 136 meshes with and operates a worm gear 142 secured to the shaft 118 outwardly of the meter 20. Price indicating means, calibrated in increments of unit price per unit of volume, are operated simultaneously with the adjustable shaft 118 and the valve 96. This means comprises a drum 144 secured to the shaft 118 adjacent the worm gear 142 and provided on its exterior surface with indications 146 and 148 of unit price, the indications 148 being arranged oppositely relative to the indications 146. The indications 146 on the drum 144 are visible through the opening 40 in one side of the casing 6, and the indications 148 are visible through a like window in the opposite side of said casing.

A total price or cost register hereinafter to be described is operated by a bevel gear 150 (Figs. 1, 2, 14 and 15) secured to the upper end of the meter shaft 70. A total volume register hereinafter to be described is operated by a gear 152 secured to a vertical shaft 154. Means are provided for operating the shaft 154 and the total volume register in accordance with the amount of liquid discharged from the meter 20. In the form of the invention disclosed in Figs. 1, 4, 6 and 7, this means comprises a gear 156 secured to the lower end of the shaft 154 and meshing with a gear 158 rotatably journaled on a stud 160 carried by a bracket 162. The bracket 162 may be mounted in any desired manner on the meter 20 or the casing 6. The gear 158 is formed integrally with a gear 164 which meshes with the peripheral teeth 166 of a gear 168 loosely journaled on a shaft 170 also journaled in the bracket 162. The gear 168 is formed integrally with a bevel gear 172 which meshes with a bevel gear 174 journaled on a stud or pin 176 secured to and extending from the shaft 170. A screw and washer 178 and 180, respectively, secure the gear 174 against movement axially of the stud or pin 176. A portion of the surface of the shaft 170 is flattened, as shown at 182 in Fig. 7, to form a bearing surface for the gear 174 and for a gear 184 which meshes with the teeth of a gear 186 formed integrally with the gear 174. The gear 184 is secured to a shaft 188 loosely journaled in a diametrically extending opening in the shaft 170.

Figures 6, 7:
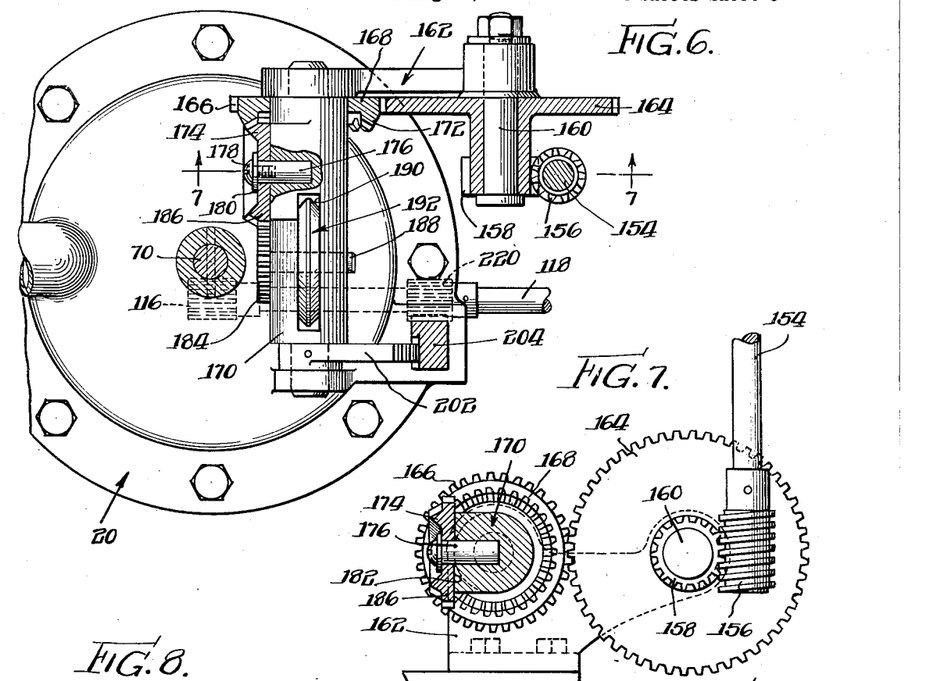
Fig. 6 is a plan section taken on the line 6—6 of Fig. 4.
Fig. 7 is a section taken on the line 7—7 of Fig. 6.

The shaft 170 is additionally provided with an axially extending slot 190 in which is positioned a friction wheel 192 secured to the stud or shaft 188. The friction wheel 192 is provided with oppositely tapering edge portions 194 and 196, Fig. 4, and a center cylindrical rim portion 198. The rim portion 198 of the friction wheel 192 is adapted to frictionally engage and be driven by a friction wheel 200 secured to the shaft 70 between the bevel gear 150 and the meter 20, the engaging surface of the friction wheel being of progressively decreasing diameter as shown in Fig. 4. Means are provided to vary the point of operating engagement between the friction wheels 200 and 192, to vary the speed of rotation of the shaft 154 relative to the shaft 70 in accordance with variations in unit price per unit of volume of the liquid being dispensed. This means comprises a gear segment 202 secured to a reduced portion of the shaft 170 and meshing with a rack bar 204, which is guided in a lug 206 formed at the upper end of the meter 20 and in the annular flanges of the bowl 74 and cylinder block 44 of the meter 20.

At its lower end the rack bar 204 is provided with a threaded opening adjustably receiving a screw 208. The screw 208 is provided with both left hand and right hand threads, the threads of one direction being received in an opening in the bar 204 and the threads of the other direction being received in a like opening in the top end of a rack bar 210 guided in the annular flanges of the cylinder block 44, the bowl 42, the cylinder head 46, and the lug 212 formed integrally with and extending laterally from the bowl 42. A knurled collar or adjusting member 214 is formed upon or secured to an intermediate portion of the adjusting screw 208. Lock nuts 216 and 218 maintain the rack bars 204 and 210 in adjusted position relative to each other. The rack bar 210 meshes at its lower end with a gear 220 secured to shaft 118 of the unit price indicating and varying means.

The operation of the meter 20, the price register operating shaft 70 and the volume register operating shaft 154 is as follows: The meter 20 and the price indicating drum 144 are first calibrated and the rack bars 204 and 210 adjusted in accordance with that calibration. Fluid supplied to the meter 20 by the motor driven pump 8 through the pipe 18 first passes into the bowl 42, thence through the inlet passages 124 and 126 to the inlet port or groove 128 and through an opening 130, with which the groove 128 may be in communication, into the cylinder 54 associated with that opening. The fluid being under substantial pressure, the piston 58 of that cylinder 54 will be forced upwardly. The conical head portion 66 of the piston rod 60 associated with that piston will engage the cam surface of the cam plate 68, thereby causing rotation of said plate. With the valve 96 in its lowermost position, the port or groove 128 will establish communication with the next or succeeding cylinder just prior to cutting off communication with the previous cylinder. The extent of movement of the pistons 58 will be determined by the amount of fluid under pressure admitted to the cylinders, and the amount of fluid so admitted is determined by the relative position of the port 128 and the cylinder openings 130. When the valve 96 is adjusted axially of the cylinders and the cam plate to admit the minimum amount of fluid to the cylinders, the unit price being at its maximum, the cylinders are successively placed in communication with the inlet passages in the valve prior to the time that the previous cylinder is cut off and therefore the pistons 58 will cause the cam plate 68 and the shaft 70 to be rotated continuously. With the intake port or groove 128 adjusted to its lowest point to admit a minimum amount of fluid to the metering cylinders, the friction wheel 192 will be so adjusted as to engage the friction wheel 200 at a point of minimum radius. The friction wheel 192 rotates the shaft 188 and the gear 184 attached thereto. The gear 184 causes the rotation of the gear 186 and the bevel gear 174 formed therewith. The bevel gear 174 causes the rotation of the combined gears 172 and 168 which in turn, through the combined gears 164 and 158, cause the rotation of the gear 156 and the shaft 154.

Upon a change in unit price per unit of volume, the knob or crank 138 is manually operated to rotate the adjusting shaft 118, by means of the worm and worm gear 140 and 142, respectively, until the new unit price is displayed behind the window 40 of the casing 6. Rotation of the shaft 118 causes a rectilinear movement of the rack bars 114 and 210. If the variation in price is in a price decreasing direction, the rack 114 will be moved upwardly, and the rack bar 210 downwardly, by the shaft 118. Assuming that the new price is the minimum for which the machine has been constructed, the valve 96 will assume the position shown in Fig. 4, wherein the lowermost portion of the groove 128 will be in horizontal registration with the openings 130 in the cylinders 54. A maximum amount of fluid will therefore be admitted into the cylinders 54 during each rotation of the valve 96 and its operating cam plate 68. As shown in Fig. 8, in this position of adjustment of the valve 96 the cylinders 54 are successively placed in communication with the inlet passages in said valve and a plurality of the cylinders are also simultaneously in communication with said inlet passages. Corresponding to this adjustment of the valve 96, the friction wheel 192 will engage the driving surface of the friction wheel 200 at a point of maximum diameter, whereby the shaft 154 is driven at its maximum speed relative to the meter shaft 70. At intermediate unit prices, the valve 96 and port 128 thereof will assume intermediate positions admitting corresponding quantities of fluid to the cylinders 54 per revolution of the valve and its operating cam 68. The friction wheel 192 will engage the friction surface of the wheel 200 at a corresponding point of intermediate diameter.

The discharge of fluid from the cylinders 54 is controlled by the outlet port 132 in the valve 96, which successively places the cylinders into communication with the interior of the upper bowl 74, from whence it is discharged through the outlet pipe.

Figure 2:
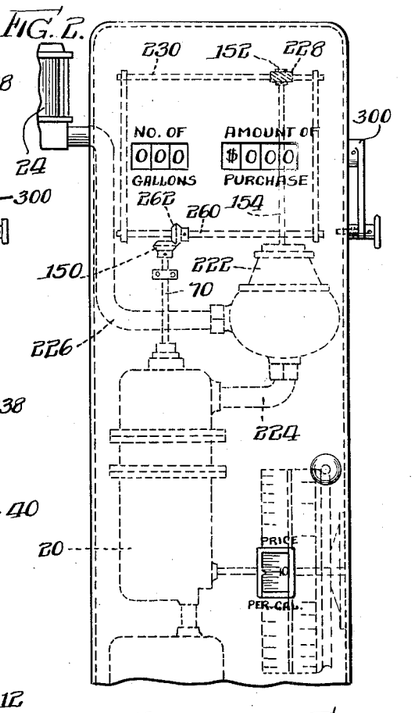
Fig. 2 is an adaptation of my invention as applied to a liquid dispensing device, more particularly a gasoline dispensing pump, wherein a second fluid displacement-meter is inserted in the flow line for operating a volume or amount register, while the meter of the type shown in Fig. 1 operates a total cost register.

In the form of the invention shown in Fig. 2, the shaft 154 of the total volume register is operated by a meter 222 of any suitable type connected by a pipe 224 to the outlet of the meter 20 and by a pipe 226 to the sight glass 24. In this form of the invention, as in the form of the invention illustrated in Figs. 1 and 6 to 13, the operating shaft 70 for the cost register is operated one revolution per metering cycle and the amount of fluid passed by the meter 20 is varied in accordance with variations in unit price per unit of volume of the fluid being dispensed.

Figure 14:
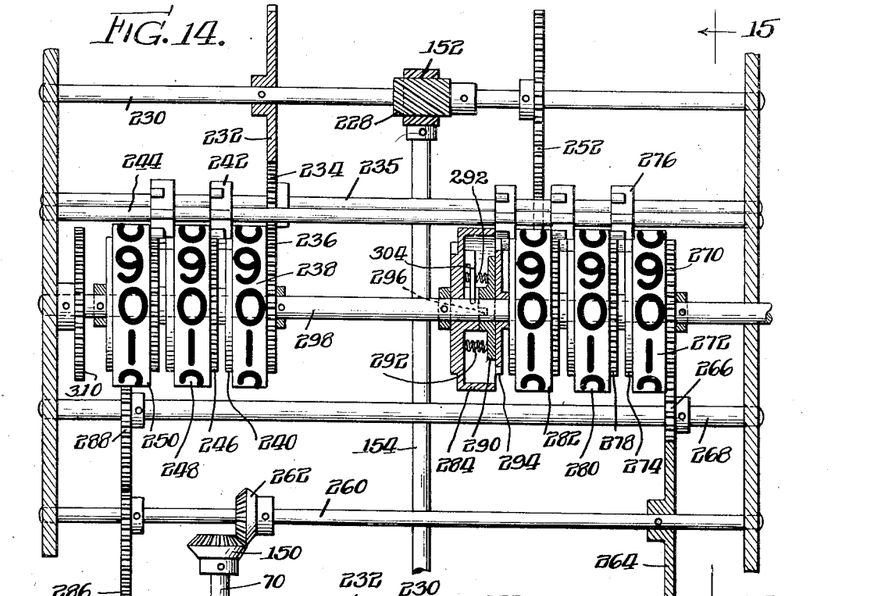
Fig. 14 is an elevational view of the total cost and total volume registers.
Figure 15:
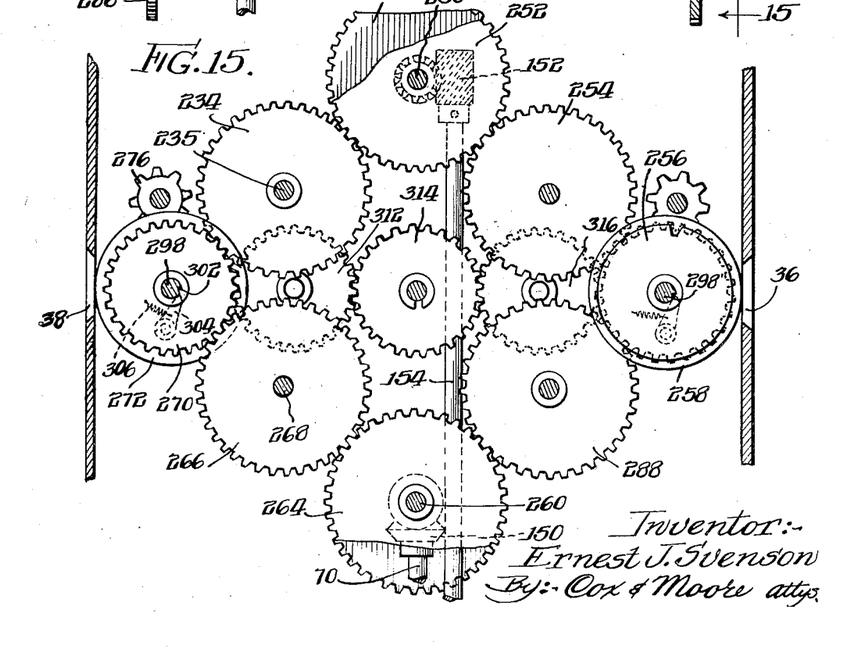
Fig. 15 is a vertical section taken along the line 15—15 of Fig. 14.

Referring to Figs. 14 and 15, it will be seen that the operating shaft 154 for the volume register drives, by means of the gear 152, a gear 228 fixed on a shaft 230 upon which shaft is fixed a gear 232, which in turn drives another gear 234 secured to a shaft 235. This gear 234 in turn drives a gear 236 frictionally connected to the lowest order indicator dial 238. This dial 238 has formed on its opposite side a one-toothed Geneva gear 240 which in turn drives a Geneva gear 242 on a shaft 244, and this Geneva gear 242 in turn drives a gear 246 frictionally connected to the second order volume indicating dial 248. In a similar manner, the dial 248 drives a third order dial 250. The three dials 238, 248 and 250 constitute the volume indicating dials. In a similar manner, a gear 252 pinned to the shaft 230 drives a gear 254, which in turn drives a gear 256 frictionally connected to the lowest order volume indicating dial 258 on the other side of the housing. This lowest order volume indicating dial 258 is connected to and drives a second order volume indicating dial (not shown), and this latter in turn drives a third order indicating dial (not shown), all in a manner similar to the operation of the second and third order indicating dials 248 and 250 previously described.

The operating shaft 70 for the total price register drives a shaft 260 by means of a gear 262 meshing with the gear 150 secured on the upper end of the shaft 70. The shaft 260 carries a gear 264 which drives a gear 266 secured to the shaft 268, which gear 266 in turn drives a gear 270 frictionally connected to the lowest order price indicating dial 272. This dial is similar in construction to the lowest order volume indicating dial 238 hereinbefore described, and, similarly, has on its opposite face a one-toothed Geneva gear 274 which drives a Geneva gear 276, which in turn drives a gear 278 frictionally connected to the second order price indicating dial 280. In sequence there are provided other price indicating dials 282 and 284 which are likewise driven through similar Geneva gear movements. The dials 272, 280, 282 and 284 constitute the total price or cost indicating dials, and these are duplicated on the opposite side of the pump housing or casing 6 to be observable through an appropriate window therein.

To carry this out, shaft 260 has fixed thereto at its end opposite the gear 264, a gear 286 which drives a gear 288 which in turn is drivingly connected to the lowest order price dial on the opposite side of the housing. All of the price indicating dials and all of the volume indicating dials are loosely mounted on their respective shafts, as are their driving gears such as gears 236, 246, 270 and 278.

Mounted within each dial is a friction disk, such as the disk 290 which is shown in cross section within the dial 284. This disk 290 is pressed by springs 292 against the surface of its driving gear 294, and this disk also has a driving connection with the dial 284 through a key 296. The key passes through a hub formed interiorly of the dial 284. Upon rotation of the gear 294 during a dispensing operation, the dial 284 will be driven through the friction disk 290. This same driving connection is provided between each one of the volume and price indicating dials and its driving gear adjacent thereto.

In order to reset these dials to initial or zero position after dispensing of the liquid, suitable mechanism is provided. The shaft 298 has on its extending end a crank handle 300, Figs. 1 and 2, which in order to reset the dials to zero must be operated at the end of every dispensing operation or transaction and before the next dispensing operation or transaction takes place. The shaft 298 has a groove 302 cut longitudinally thereon, as shown in Fig. 15, which, upon rotation of the handle 300 in a clockwise direction, engages a pawl 304 at some time during its rotation. The pawl 304 is mounted on the inner side of each of the dials (Fig. 15) and has a spring 306 to keep the pawl in engagement with the surface of the shaft in position to drop into the groove 302. By turning the crank 300, the notch 302 in the shaft 298 engages the pawl 304, thereby turning the dials to which the corresponding pawls are attached. In this way the dials are set to a starting or zero position and are prepared for another indicating operation. The driving gears for the indicating dials do not interfere with their zero setting because of the fact that the dials are frictionally driven by the gears.

Means are provided for insuring that on a single rotation of the resetting shaft 298 and its similar resetting shaft 298', the crank handle 300, in order to complete a resetting operation, is rotated a complete revolution of 360 degrees. The end of the handle 300 carries a spring pressed latch or pin 308 which registers with a small opening in the side of the housing. When the handle 300 has been rotated one revolution, the spring pressed latch will automatically snap into the opening in the housing and thereby prevent the operator from passing the zero positions on the indicating dials. The shaft 298 carries on its inner end a gear 310 fixed thereto. This gear drives a gear 312 and the latter, in turn, drives a gear 314. An idler gear 316 meshes with the gear 314 and with a gear (not shown) secured to the reset shaft 298', whereby the shaft 298' is reset simultaneously with the shaft 298.

The resetting operation resets the volume and total price dials to zero but does not affect the register operating shafts 70 and 154, and accordingly, said shafts remain stationary during the resetting operation.

It is to be understood that any desired type of conventional resetting mechanism, either manual or power operated, may be utilized in lieu of the resetting mechanism herein described, and also that means well known in the art may be utilized for interlocking the manual or power reset means with the support for the hose nozzle.

Changes may be made in the form, construction and arrangement of parts without departing from the spirit of the invention or sacrificing any of its advantages, and the right is hereby reserved to make all such changes as fairly fall within the scope of the following claims.

The invention is hereby claimed as follows:

1. In liquid dispensing apparatus, the combination of a source of liquid supply, a pump, the intake side of which is connected to said source, dispensing means, a meter connected to the outlet side of said pump and to said dispensing means, a cost indicating register operated by said meter, an amount indicating register, means for varying the amount of fluid passing through said meter per unit of operation in accordance with variations in the unit cost per unit amount of the fluid being dispensed, and means operably connected to said last mentioned means for operating the amount indicating register.

2. In liquid dispensing apparatus, the combination of a source of supply, dispensing means, means for measuring the liquid dispensed, a cost register, means connecting the register to said measuring means for operating said register through a fixed registration per unit of operation of the measuring means independent of the amount of liquid measured, means for varying the amount of liquid passing through said measuring means in accordance with variations in unit cost per unit amount, an amount indicating register, and means connected to said measuring means for operating said last mentioned register in accordance with the amount of liquid measured.

3. In liquid dispensing apparatus, the combination of a source of liquid supply, dispensing means, a meter, the inlet of which is connected to said source and the outlet of which is connected to said dispensing means, said meter comprising a plurality of relatively shiftable means for measuring the amount of liquid dispensed, a cost indicating register, a cam operated by said relatively shiftable means and connected to said cost indicating register for operating the latter a fixed amount per cycle of operation of said plurality of relatively shiftable means, means connected to said cam for controlling the flow of liquid passing through said relatively shiftable means, and means for controlling said flow control means selectively to change the amount of liquid passing through said meter in accordance with variations in unit cost per unit amount of liquid dispensed.

4. In liquid dispensing apparatus, the combination of a source of liquid supply, dispensing means, a meter, the inlet of which is connected to said source and the outlet of which is connected to said dispensing means, said meter comprising a plurality of relatively shiftable means for measuring the amount of liquid dispensed, a cost indicating register, a cam operated by said relatively shiftable means and connected to said cost indicating register for operating the latter a fixed amount per cycle of operation of said plurality of relatively shiftable means, a rotary member connected to said cam for controlling the flow of liquid passing through said relatively shiftable means, and means for controlling said flow control means selectively to change the amount of liquid passing through said meter in accordance with variations in unit cost per unit amount of liquid dispensed.

5. In liquid dispensing apparatus, the combination of a source of liquid supply, dispensing means, a meter, the inlet of which is connected to said source and the outlet of which is connected to said dispensing means, said meter comprising a plurality of relatively shiftable means for measuring the amount of liquid dispensed, a cost register, means operated by said relatively shiftable means for operating said cost register a fixed amount per cycle of operation of said plurality of relatively shiftable means, a valve connected to said operating means for controlling the flow of liquid passing through said relatively shiftable means, and means for controlling said flow control valve selectively to change the amount of liquid passing through said meter in accordance with variations in unit cost per unit amount of liquid dispensed.

6. In liquid dispensing apparatus, the combination of a source of liquid supply, dispensing means, a meter, the inlet of which is connected to said source and the outlet of which is connected to said dispensing means, said meter comprising a plurality of relatively shiftable means for measuring the amount of liquid dispensed, a cost indicating register, a cam operated by said relatively shiftable means and connected to said cost indicating register for operating the latter a fixed amount per cycle of operation of said plurality of relatively shiftable means, a valve connected to said cam for controlling the flow of liquid passing through said relatively shiftable means, and means for controlling said flow control valve selectively to change the amount of liquid passing through said meter in accordance with variations in unit cost per unit amount of liquid dispensed.

7. In liquid dispensing apparatus, the combination of a source of liquid supply, dispensing means, a meter, the inlet of which is connected to said source and the outlet of which is connected to said dispensing means, said meter comprising a plurality of relatively shiftable means for measuring the amount of liquid dispensed, a cost indicating register, a cam operated by said relatively shiftable means and connected to said cost indicating register for operating the latter a fixed amount per cycle of operation of said plurality of relatively shiftable means, a rotary valve adjustably connected to said cam for controlling the flow of liquid passing through said relatively shiftable means, and means for controlling said rotary flow control valve selectively to change the amount of liquid passing through said meter in accordance with variations in unit cost per unit amount of liquid dispensed.

8. In liquid dispensing apparatus, the combination of a source of liquid supply, dispensing means, a meter, the inlet of which is connected to said source and the outlet of which is connected to said dispensing means, said meter comprising a plurality of relatively shiftable means for measuring the amount of liquid dispensed, a cost register, means operated by said relatively shiftable means for operating said cost register a fixed amount per cycle of operation of said plurality of relatively shiftable means, a rotary valve adjustably connected to said operating means for controlling the flow of liquid passing through said relatively shiftable means, and means for controlling said rotary flow control valve selectively to change the amount of liquid passing through said meter in accordance with variations in unit cost per unit amount of liquid dispensed.

9. In liquid dispensing apparatus, the combination of a source of liquid supply, dispensing means, a meter, the inlet of which is connected to said source and the outlet of which is connected to said dispensing means, said meter comprising a plurality of relatively shiftable means for measuring the amount of liquid dispensed, a cost indicating register, a cam operated by said relatively shiftable means and connected to said cost indicating register for operating the latter a fixed amount per cycle of operation of said plurality of relatively shiftable means, means connected to said cam for controlling the flow of liquid passing through said relatively shiftable means, and adjustable unit price indicating means for controlling said flow control means selectively to change the amount of liquid passing through said meter in accordance with variations in unit cost per unit amount of liquid dispensed.

10. In liquid dispensing apparatus, the combination of a source of liquid supply, dispensing means, a meter, the inlet of which is connected to said source and the outlet of which is connected to said dispensing means, said meter comprising a plurality of relatively shiftable means for measuring the amount of liquid dispensed, a cost indicating register, a cam operated by said relatively shiftable means and connected to said cost indicating register for operating the latter a fixed amount per cycle of operation of said plurality of relatively shiftable means, a rotary member connected to said cam for controlling the flow of liquid passing through said relatively shiftable means, and adjustable unit price indicating means for controlling said flow control means selectively to change the amount of liquid passing through said meter in accordance with variations in unit cost per unit amount of liquid dispensed.

11. In liquid dispensing apparatus, the combination of a source of liquid supply, dispensing means, a meter, the inlet of which is connected to said source and the outlet of which is connected to said dispensing means, said meter comprising a plurality of relatively shiftable means for measuring the amount of liquid dispensed, a cost register, means operated by said relatively shiftable means for operating said cost register a fixed amount per cycle of operation of said plurality of relatively shiftable means, means connected to said cost register operating means for controlling the flow of liquid passing through said relatively shiftable means, an amount indicating register, means connected to the cost register operating means for operating said amount indicating register, said last means comprising a motion transmitting mechanism having an adjustable ratio of movement relative to said cost register operating means, means for controlling said flow control means to vary the amount of liquid passed through said relatively shiftable means in accordance with variations in unit cost per unit amount of liquid dispensed, and means connected to said last mentioned means for adjusting the ratio of movement of said motion transmitting mechanism in accordance with said variations.

12. In liquid dispensing apparatus, the combination of a source of liquid supply, dispensing means, a meter, the inlet of which is connected to said source and the outlet of which is connected to said dispensing means, said meter comprising a plurality of relatively shiftable means for measuring the amount of liquid dispensed, a cost indicating register, a cam operated by said relatively shiftable means and connected to said cost indicating register for operating the latter a fixed amount per cycle of operation of said plurality of relatively shiftable means, means connected to said cam for controlling the flow of liquid passing through said relatively shiftable means, an amount indicating register, means connected to said cam for operating said amount indicating register, said last means comprising a motion transmitting mechanism having an adjustable ratio of movement relative to said cam, means for controlling the flow control means to vary the amount of liquid passed through said relatively shiftable means in accordance with variations in unit cost per unit amount of liquid dispensed, and means connected to said last mentioned means for adjusting the ratio of movement of said motion transmitting mechanism in accordance with said variations.

13. A meter, liquid displacement means therefor operated by the flow of liquid through said meter, price registering means operated by said displacement means in proportion to the volume of liquid displaced thereby, means for adjustably varying the operation of said displacement means by the liquid flow in accordance with units of price per volume of the liquid flowing through said meter, said liquid displacement means comprising a cylinder and piston construction wherein the piston is floatingly mounted in the cylinder, and said varying means including provisions for controlling the amount of liquid introduced into the cylinder at each cycle of operation of the meter whereby to adjust the stroke of the piston therein.

14. In a gasoline computing pump, the combination of means forming a liquid flow line through which liquid is adapted to flow under pressure, means for controlling the flow of liquid through said line, two meters in series in said line, each meter having an operable element moved in proportion to the flow of liquid through said meter, volume registering means operated by the operable element of one of said meters, price registering means operated by the operable element of the second meter, means for variably adjusting the movement of the operable element of said second meter in accordance with selected values of price per unit of volume, said operable element of said second meter comprising a piston floatingly mounted in a cylinder, and said adjusting means having provisions for varying the amount of liquid introduced into the cylinder per cycle of operation of said second meter whereby to adjust the stroke of the piston therein.

15. In liquid dispensing apparatus, the combination of a source of liquid supply, a pump, the inlet side of which is connected with said source, dispensing means, a meter connected to the outlet side of said pump and to said dispensing means, a cost indicating register operated by said meter, an amount indicating register, means for operating said amount indicating register in accordance with the amount of liquid passed through said meter, means for varying the amount of liquid passed through said meter in accordance with the variations of unit cost of the liquid dispensed, said meter including a cylinder and piston construction wherein the piston is floatingly mounted within the cylinder, and said varying means having provisions for controlling the amount of liquid introduced into the cylinder per cycle of operation of the meter whereby to adjust the stroke of the piston therein.

16. In liquid dispensing apparatus, the combination of a source of fluid supply, a pump, the intake side of which is connected to said source, dispensing means, a meter connected to the outlet side of said pump and to said dispensing means, a cost register operated by said meter, means for varying the amount of fluid passing through said meter in accordance with variations in the unit cost per unit amount of the fluid being dispensed, said meter comprising a cylinder and piston construction wherein the piston is floatingly mounted within the cylinder, and said varying means having provisions for adjustably controlling the amount of fluid introduced into the cylinder per cycle of operation of the meter whereby to adjustably control the stroke of the piston therein.

17. In liquid dispensing apparatus, the combination of a source of liquid supply, dispensing means, a meter connected to said source and to said dispensing means, a cost register, means for operating said cost register through a fixed registration per cycle of operation of said meter, means for varying the amount of liquid passed through said meter in accordance with variations in unit cost per unit amount of the liquid dispensed, said meter comprising a cylinder and piston construction wherein the piston is floatingly mounted in the cylinder, and said varying means including provisions for adjustably controlling the amount of liquid passed through the cylinder per cycle of operation of the meter whereby to adjustably control the stroke of the piston in the cylinder.

ERNEST J. SVENSON.